United States Patent
Ekpenyong

(10) Patent No.: US 10,218,900 B2
(45) Date of Patent: Feb. 26, 2019

(54) DOCUMENT REORIENTATION PROCESSING

(71) Applicant: NCR Corporation, Duluth, GA (US)

(72) Inventor: Olufisayo Adebanke Ekpenyong, Kitchener (CA)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 15/365,879

(22) Filed: Nov. 30, 2016

(65) Prior Publication Data

US 2018/0152629 A1    May 31, 2018

(51) Int. Cl.
| | |
|---|---|
| H04N 5/232 | (2006.01) |
| G06K 9/60 | (2006.01) |
| G06T 3/40 | (2006.01) |
| G06K 9/52 | (2006.01) |
| H04N 1/387 | (2006.01) |

(52) U.S. Cl.
CPC .......... *H04N 5/23222* (2013.01); *G06K 9/52* (2013.01); *G06K 9/605* (2013.01); *G06T 3/403* (2013.01); *H04N 1/387* (2013.01); *G06T 2207/30176* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 8,699,779 | B1 * | 4/2014 | Prasad | G06K 9/32 382/137 |
| 9,160,946 | B1 * | 10/2015 | Semenov | H04N 5/357 |
| 2013/0163049 | A1 * | 6/2013 | Kirihata | G06K 15/02 358/1.15 |
| 2014/0376060 | A1 * | 12/2014 | Bocharov | H04N 1/23 358/474 |
| 2015/0247190 | A1 * | 9/2015 | Ismagilov | C12Q 1/6851 506/9 |

* cited by examiner

*Primary Examiner* — Mark T Monk
(74) *Attorney, Agent, or Firm* — Schwegman, Lundberg & Woessner

(57) ABSTRACT

Video frames of a document are captured. A current orientation mode of a device having a camera is determined based on the video frames. An optimal orientation mode for capturing a document image is determined. Guided instructions assist in placing the device in the optimal orientation mode and when the document is centered in a lens of the camera, the document image is taken by the camera.

6 Claims, 4 Drawing Sheets

DOCUMENT REORIENTATION PROCESSING

BACKGROUND

Increasingly consumers are conducting financial transactions and performing business accounting through consumer-operated devices, such as: Self-Service Terminals (SSTs) without the assistance of a clerk and mobile device owned/operated by the consumers.

For example, it is fairly common for a consumer to now use a mobile device, such as a phone to take a picture of a check and deposit that check with a bank using a mobile application. A variety of issues are usually encountered in this process.

However, this process will typically not work well with larger documents or financial instruments, such as invoices that can be 8½ by 11 inches. Additionally, larger documents typically require better image quality than do smaller documents, such as checks for purposes of performing Optical Character Recognition (OCR) on the documents. These means that larger documents require higher resolution images for OCR than what is conventionally used for check image capture in the industry.

However, even with traditional check image capture and processing applications, there are still issues that have yet to be overcome in the industry. For example, the consumer is usually required to manually align the check image in a screen of the mobile device and press a button to snap a picture of the check; the check image is then sent from the mobile application to the bank. This can create a variety of problems that prevents the bank from being able to process the check information from the consumer-captured image, such as: 1) a poor angle used by the consumer in taking the image, 2) the image does not include all edges of the check information resulting in some information being unavailable in the check image, 3) the lighting when the image was taken was of poor quality such that the check information cannot be processed, 4) the consumer's hand was shaking when the photo was taken for whatever reason (consumer traveling, etc.) resulting in a blurred check image.

Typically, the consumer is unaware of what the problem was and the bank just reports a non-meaningful error back to the consumer that the check cannot be deposited with the bank. The consumer may or may not try again; usually the consumer thinks that something is wrong with the check itself and may call the entity that provided the check or may personally visit a bank branch in an attempt to deposit the check. Any of these options are time consuming and are undesirable situations for both the consumer and the bank.

Additionally, with traditional mobile check capture the screen orientation is preset on the mobile device in landscape mode. For larger documents, this may not always be the proper orientation that would enable the user to take a larger sized image. Further, many times the user is not aware that changing the orientation would allow the user to move closer to the image and get a better quality image.

SUMMARY

In various embodiments, methods and a system for document reorientation processing is presented.

According to an embodiment, a method for document reorientation processing is provided. Specifically, document images for a document are captured by a device. for edges are identified for a document from the document images, and from the width and height of the document a determination is made as to whether the document is in the correct orientation that would maximize the camera preview area. Next, an optimal orientation for capturing an optimal image of the document is resolved based on the width to height ratio of the document when compared to that of the camera's preview width to height ratio. Then, the optimal orientation is visually displayed to the user. Finally, the device is activated to capture the optimal image for the document in the optimal orientation.

DETAILED DESCRIPTION

Figure 1:
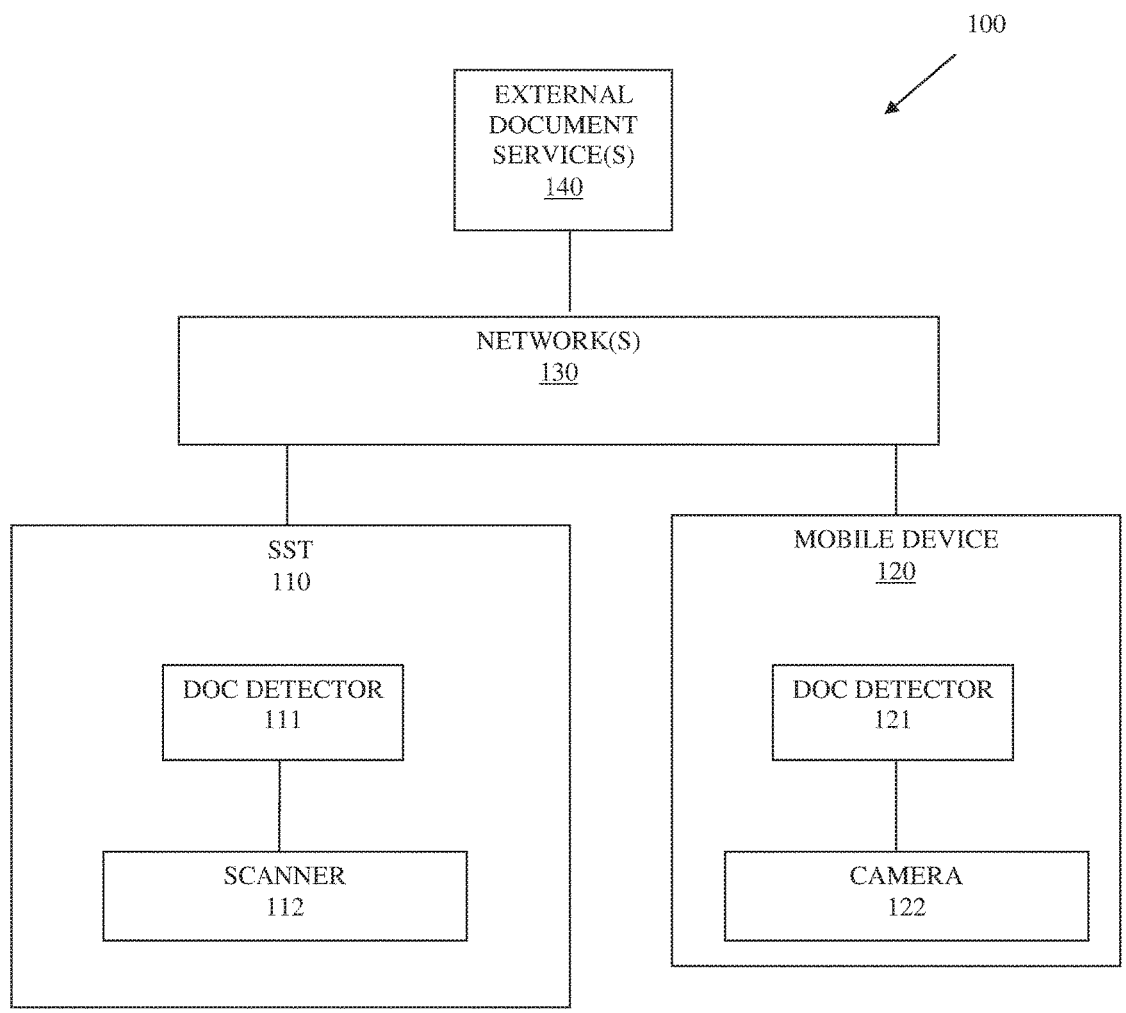
FIG. 1 is a diagram of a system for automatic document reorientation processing, according to an example embodiment.

FIG. 1 is a diagram of a system 100 for automatic document reorientation processing, according to an example embodiment. The various components are illustrated and the arrangement of the components is presented for purposes of illustration only. It is to be noted that other arrangements with more or less components are possible without departing from the automatic document detection processing presented herein and below.

The system 100 includes one or more of: a Self-Service Terminal (SST) 110 and a mobile device 120. That is, either a SST 110 or a mobile device 120 can be present in the system or both can be present.

The SST 110 includes a document detector 111 and a scanner 112 (stationary or portable and interfaced to the SST 110). The mobile device 120 includes a document detector 121 and an integrated camera 122.

The SST 110 and/or mobile device 120 connect through one or more networks 130 (wired, wireless, or a combination of wired and wireless) to one or more external document services 140.

The external document services 140 provide services relevant to document images transferred from the document detectors 111 and 121. For example, banking services, accounting services, transaction processing services, and others. The external document services 140 also perform Optical Character Recognition (OCR) on document images provided by the document detectors 111 and 121.

For purposes of the discussion that follows, the processing is discussed from the perspective of the mobile device 120, the document detector 121, and the camera 122. Although it is to be noted that the described processing that follows applies equally and correspondingly to the SST 110, document detector 111, and scanner 112 with the modification of rotating the document instead of the mobile device 120 when the scanner 112 is not a portable scanner of the SST 110.

During operation of the mobile device 120, a mobile application that executes on one or more processors of the mobile device includes the document detector 121. A user/operator of the mobile device 120 initiates the mobile application and selects an option for capturing an image of a document (such as an invoice, a receipt, a check, a government issued photo identification card, a credit card, a debit card, a loyalty card, and the like). When the option for capturing an image of the document is selected, an integrated camera 122 of the mobile device 120 is initiated and the camera 122 begins recording video available through the lens of the camera 122 for automated document reorientation and detection processing.

Simultaneous to the camera 122 being initiated, the document detector 121 is initiated by the mobile application. The document detector 121 receiving the video being recorded by the camera 122.

The document detector 121 processes in five phases for: 1) determining when to automatically activate the camera 122 for capturing a still image of a document, 2) determining the rectangular edges of the document from frames of the video, 3) calculate a proper orientation of the camera 122 for capturing a still image of the document, 4) visually illustrate on a screen rendered on a display of the device 120 the proper orientation for obtaining a still image of the document, and 5) activating the camera 122 to take a still image once the document is detected in the video frames as with the camera 122 oriented in the proper orientation.

It is to be noted that the document detector 121 may be part of a mobile application (app) that processes on the mobile device 120, such that when the application is accessed phase one begins immediately when the application user-interface appears for user interaction.

In phase one processing, the document detector 121, as soon as it is initiated, begins processing frames of images that are being captured by the camera 122 for determining within a few seconds (approximately 1 to 3 seconds) the frames per second (FPS) that the camera 122 is capturing video of the document as the user operator maneuvers the camera lens over the document. This first few seconds also allows for time to account for the time it takes the consumer from selecting the option to capture an image of the document to steady the camera over the document for which an image is to be taken.

During this time images of the document appear in the frames, the document detector 121 identifies the document edges (e.g., the perimeter lines and corners of the document identified by rectangles).

When a frame is processed, the document detector 121 determines from the frame a perimeter rectangle that defines the outer edges of the document. The area inside the rectangle represents the "region of interest." The region of interest includes the pixel values that are to be processed downstream by the external document service(s) for Optical Character Recognition (OCR) and additional automated downstream processing for automatically performing one or more operations on behalf of the user Next (phase two), the document detector 121 calculates a first width-to-height ratio of the rectangular edges for the document without regard to the current orientation mode of the camera 122. The document detector 121 also calculates a second width-to-height ratio of the camera preview area as defined by the current orientation mode that the camera 122 is set in, such as defined by a portrait or landscape mode of camera 122.

Once the width-to-height ratios are calculated, phase three begins where comparisons are made between the first and second width-to-height ratios against a predefined threshold (such as the integer 1). When the second width-to-height ratio calculated for the current orientation mode of the camera is greater than 1 and the first width-to-height ratio is less than 1. This is an indication to the document detector 121 that the current orientation mode that the user is using to manipulate and orient the camera to take a still image of the document needs to change. Furthermore, when the second width-to-height ratio calculated for the current orientation mode is less than 1 and the first width-to-height ratio is greater than 1; this is an indication to the document detector 121 that the current orientation mode that user is using to manipulate and orient the camera 122 to take a still image of the document needs to change. Also, when the two ratios are the same the current orientation mode as currently being oriented by the user is correct. The document detector 121 identifies in phase three whether the current orientation mode for the camera 122 needs reoriented or whether it is correct as currently being done by the user. Therefore, current orientation mode and the optimal (proper and calculated) orientation mode is resolved by the document detector at the conclusion of phase three.

In phase four, and when the current orientation mode is different from the optimal orientation mode, a reoriented guiding rectangle is presented on a screen of the device's display and presented in a center of the camera's preview focus area. The displayed rectangle is the same size as the edges of the document so that the document can be centered by the user within the displayed rectangle. A message within the screen instructs the user to reorient the camera 122 (i.e. from portrait to landscape or vice versa) and enclose the document within the guiding rectangle using the camera preview of what the lens is recording for the document.

As the user changes the orientation (reorients) of the camera 122 by rotating the device 120, the document detector 121 identifies when the top-left coordinate of the rectangle edges of the document image correspond to the top-left coordinate of the guiding rectangle or is within a predefined threshold of difference. The document detector 121 may also determine if the center of the document image as identified by that portion of the image enclosed within the guiding rectangle corresponds to a previously calculated center of the document (which can be identified from the initial determination of the region of interest made in phase two).

When the current orientation mode is the same as the optimal orientation mode, the document detector 121 does not need to present the guiding rectangle as described above or provide any instruction for the user to reorient the device 120.

As soon as the document detector 121 determines that the document image is centered or substantially centered (based on any differences in the top-left corners and/or the centers compared against threshold(s)) in the guiding rectangle, the document detector 121 would perform additional processing (such as information the user to move closer if need or focusing the camera lens) and then the document detector 121 automatically activates the camera and takes an image of the document as phase five of processing. This is can be done automatically and without the user-operator having to manually activate a button on the mobile device 120 to take the still image. In an embodiment, the document detector 121 displays a presented button on the screen of the device's display once the document image is properly oriented and centered and the user presses the button to capture the document image. In an embodiment, the button is unavailable for capturing the document image until the device 120 is in the optimal orientation mode and the document image is centered within the guiding rectangle.

One now appreciates how larger documents can be processed by a document detector 121 or 111 for automatic guided device reorientation for purposes of capturing a complete and accurate document image. This ensures that subsequent document processing for OCR and automated user transactions by external document services 140 can process with less errors and improved accuracy/efficiency.

In an embodiment, the mobile device 120 is a phone.

In an embodiment, the mobile device 120 is a tablet computer.

In an embodiment, the mobile device 120 is a wearable processing device.

In an embodiment, the mobile device 120 is a network-connected camera.

In an embodiment, the mobile device 120 is a laptop computer.

In an embodiment, the mobile device 120 is an intelligent appliance having a network addresses and processing capabilities such that it is capable of being part of the Internet of Things (IoTs).

In an embodiment, the SST 110 is an Automated Teller Machine (ATM).

In an embodiment, the SST 110 is a kiosk.

In an embodiment, the SST 110 is a self-service checkout station.

In an embodiment, the SST 110 is a Point-Of-Sale (POS) terminal operated by a clerk on behalf of customers.

In an embodiment, the document is a large document that is larger than a consumer identification or credit card. In an embodiment, the document is larger than letter size (8½ inches by 11 inches). In an embodiment, the document is a consumer invoice.

These and other embodiments are now discussed with reference to the FIGS. 2-4.

Figure 2:
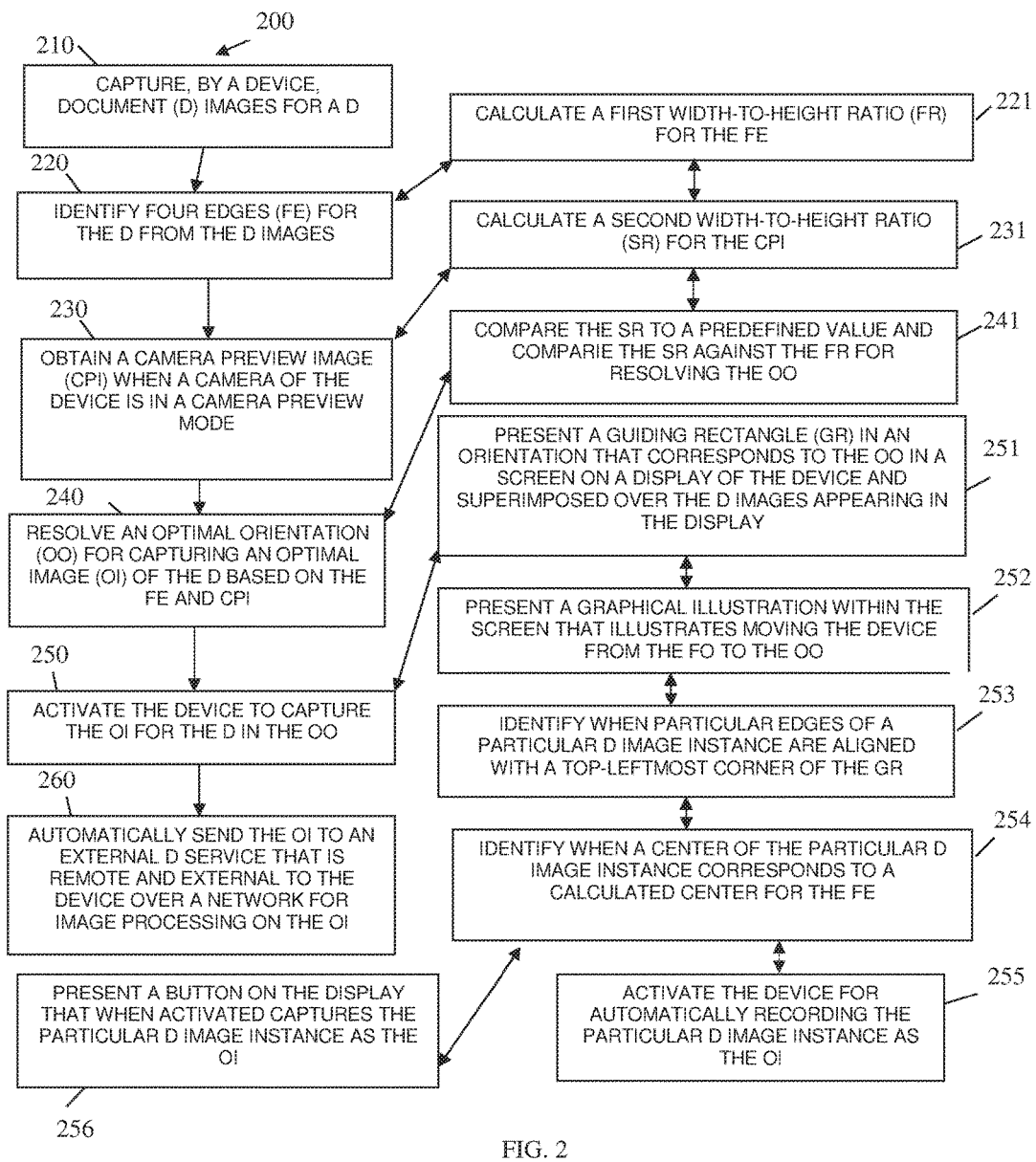
FIG. 2 is a diagram of a method for automatic document reorientation processing, according to an example embodiment.

FIG. 2 is a diagram of a method 200 for automatic document reorientation processing, according to an example embodiment. The software module(s) that implements the method 200 is referred to as an "reorientation manager." The reorientation manager is implemented as executable instructions programmed and residing within memory and/or a non-transitory computer-readable (processor-readable) storage medium and executed by one or more processors of a device. The processor(s) of the device that executes the reorientation manager are configured and programmed to process the reorientation manager. The reorientation manager has access to one or more networks during its processing. The networks can be wired, wireless, or a combination of wired and wireless.

In an embodiment, the device that processes the reorientation manager is the mobile device 120. In an embodiment, the mobile device 120 is one of: a phone, a tablet computer, a laptop computer, a wearable processing device, and a device that is part of the IoTs.

In an embodiment, the reorientation manager the document detector 121.

In an embodiment, the device that processes the reorientation manager is the SST 110. In an embodiment, the SST 110 is one of: a POS terminal operated by a clerk, an ATM, and a kiosk.

In an embodiment, the reorientation manager is the document detector 112.

The device that executes the reorientation manager includes an integrated or interfaced camera. The camera includes video capabilities and still picture taking capabilities. In an embodiment, the camera is a scanner.

In an embodiment, reorientation manager is a subcomponent or integrated module of an application processing on the device where that application is capable of network communication to a remote and external document service, such as a banking/financial service, retail service, accounting service, etc. The application having a user-facing interface for interacting with the user who is operating the device for capturing an image of a document and sending the document image to the external document service for further processing that at least includes OCR processing on the document image to identify document information from the document image.

In an embodiment, the reorientation manager executes on a device that also performs the OCR on the document image. In these embodiments, the device that executes the reorientation manager can be any of the above-mentioned devices or other devices, such as a standalone printer/scanner, a desktop computer, and the like.

At 210, the reorientation manager captures (on a device having an integrated scanner and/or camera) document images for a large document (document larger than a check, in an embodiment a document that is at least 8½ inches by 11 inches).

At 220, the reorientation manager identifies the four edges for the document from the document images.

According to an embodiment, at 221, the reorientation manager calculates a width-to-height ratio for the four edges.

At 230, the reorientation manager obtains a camera preview image when a camera of the device is in a camera preview mode and the device is in a first orientation. In an embodiment, when the camera of the device is stationary, the first orientation is the orientation of the document with respect to the stationary camera when first captured by the camera.

In an embodiment of 221 and 230, at 231, the reorientation manager calculates a second width-to-height ratio for the camera preview image.

At 240, the reorientation manager resolves an optimal orientation for capturing an optimal image of the document based on the four edges and the camera preview image.

In an embodiment of 231 and 240, at 241, the reorientation manager compares the second width-to-height ratio to a predefined value (such as the integer 1) and compares the first width-to-height ratio against the first width-to-height ratio for resolving the optimal orientation. This was discussed above with respect to the phase three processing of the system 100 in the FIG. 1.

At 250, the reorientation manager activates the device to capture the optimal image for the device while the device is in the optimal orientation. In an embodiment, where the camera is a stationary camera the optimal orientation is achieved by changing the orientation of the document with respect to the stationary camera.

In an embodiment, at 251, the reorientation manager presents a guiding rectangle in an orientation that corresponds to the optimal orientation in a screen rendered on a display of the device and superimposed over the document images appearing in the display.

In an embodiment of 251 and at 252, the reorientation manager presents a graphical illustration within the screen that illustrates moving the device (of the document) from the first orientation to the optimal orientation.

In an embodiment of 252 and at 253, the reorientation manager identifies when particular edges of a particular document instance are aligned with a top-leftmost corner of the graphical illustration. This can be an animated video played on the display of the device.

In an embodiment of 253 and at 254, the reorientation manager identifies when a center of the particular document image instance corresponds to a calculated center for the four edges.

In an embodiment of 254 and at 255, the reorientation manager activates the device for automatically recording the particular document instance as the optimal image.

In an embodiment of 254 and at 256, the reorientation manager presents a button on the display that when activated captures the particular document instance as the optimal image.

In an embodiment, at 260, the reorientation manager automatically sends the optimal image to an external document service that is remote and external to the device over a network for image processing on the optimal image. In an embodiment, the external document service is the external document service 140.

The reorientation manager interacts with a user that is operating a mobile application processing on the device and having the reorientation manager.

Figure 3:
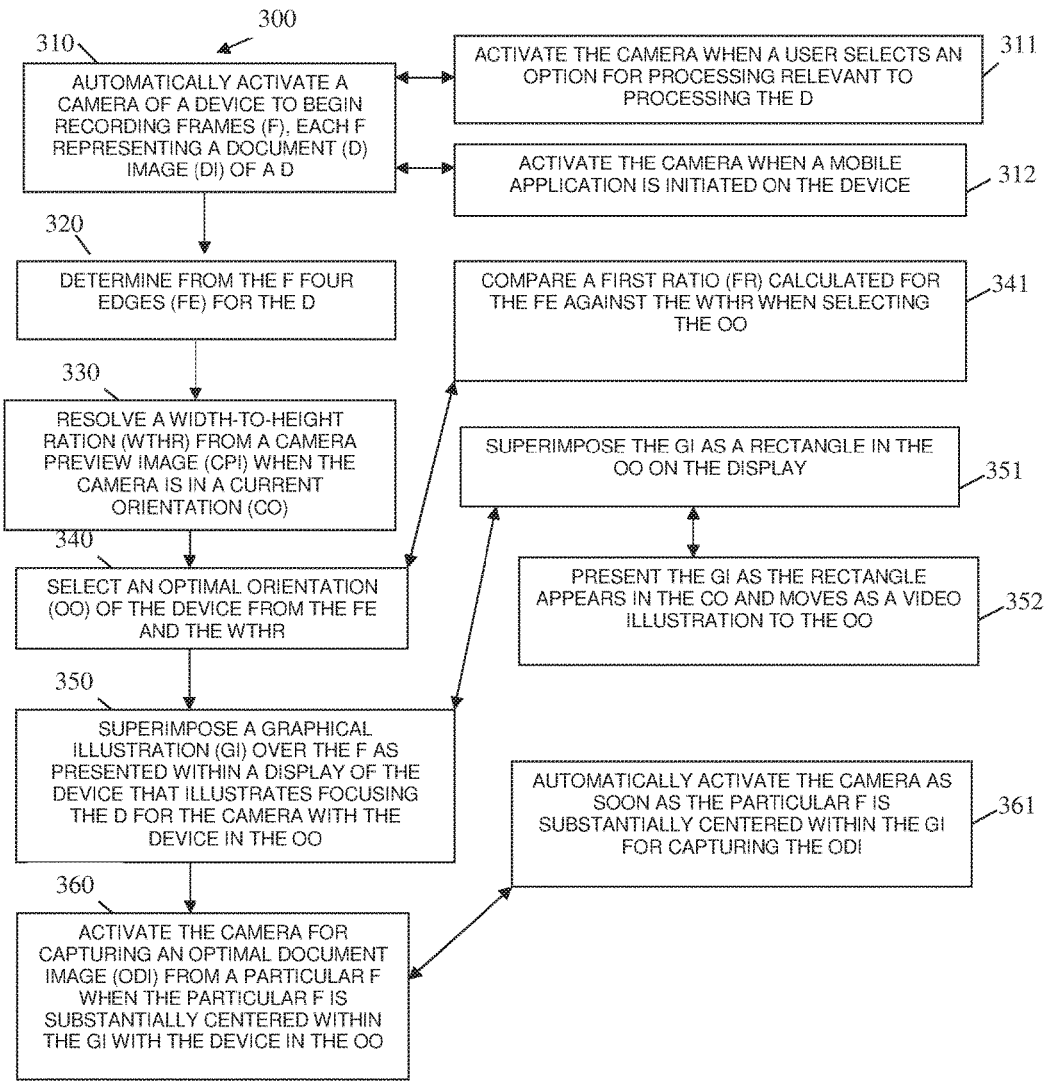
FIG. 3 is a diagram of another method for automatic document reorientation processing, according to an example embodiment.

FIG. 3 is a diagram of another method 300 for automatic document reorientation processing, according to an example embodiment. The software module(s) that implement the method 300 is referred to herein as an "optimal image reorientation manager." The optimal image reorientation manager is implemented as executable instructions and programmed within memory and/or a non-transitory computer-readable (processor-readable) storage medium that executes on one or more processors of a device. The processors of the device are specifically configured to execute the optimal image reorientation manager. The optimal image reorientation manager can access one or more networks; the networks can be wired, wireless, or a combination of wired and wireless.

The optimal image reorientation manager presents another and in some ways enhanced processing perspective of the reorientation manager (discussed above with reference to the FIG. 2).

In an embodiment, the optimal image reorientation manager is the reorientation manager of the FIG. 2.

In an embodiment, the device that processes the optimal image reorientation manager is the mobile device 120. In an embodiment, the mobile device 120 is one of: a phone, a tablet computer, a laptop computer, a wearable processing device, and a device that is part of the IoTs.

In an embodiment, the optimal image reorientation manager is the document detector 121.

In an embodiment, the device that processes the optimal image reorientation manager is the SST 110. In an embodiment, the SST 110 is one of: a POS terminal operated by a clerk, an ATM, and a kiosk.

In an embodiment, the optimal image reorientation manager is the document detector 112.

The device that executes the optimal image reorientation manager includes an integrated or interfaced camera. The camera includes video capabilities and still picture taking capabilities. In an embodiment, the camera is a scanner.

In an embodiment, the optimal image reorientation manager is a subcomponent or integrated module of an application processing on the device where that application is capable of network communication to a remote and external document service, such as a banking/financial service, retail service, accounting service, etc. The application having a user-facing interface for interacting with the user who is operating the device for capturing an image of a document and sending the document image to the external document service for further processing that at least includes OCR processing on the document image to identify document information from the document image.

In an embodiment, the optimal image reorientation manager executes on a device that also performs the OCR on the document image. In these embodiments, the device that executes the optimal image reorientation manager can be any of the above-mentioned devices or other devices, such as a standalone printer/scanner, a desktop computer, and the like.

At 310, the optimal image reorientation manager automatically activates a camera of a device to begin recording frames. Each frame representing a document image of a document in a field of view of a lens of the camera.

According to an embodiment, at 311, the optimal image reorientation manager activates the camera when a user selects an option for processing that is relevant to processing the document.

In an embodiment, at 312, the optimal image reorientation manager activates the camera when a mobile application is initiated on the device.

At 320, the optimal image reorientation manager determines from the frames four edges of the document.

At 330, the optimal image reorientation manager resolves a width-to-height ratio from a camera preview image captured when the camera is in a current orientation and the camera is in a camera preview mode of operation. In an embodiment, when the camera is stationary within the device, the current orientation is with respect to the document in front of the lens of the camera.

At 340, the optimal image reorientation manager selects an optimal orientation of the device (or the document with respect to a stationary camera of the device) from the four edges and the width-to-height ratio of the camera preview image.

According to an embodiment, at 341, the optimal image reorientation manager compares a first ratio calculated for the four edges against the width-to-height ratio when selecting the optimal orientation.

At 350, the optimal image reorientation manager superimposes a graphical illustration over the frames as they are being presented within a display of the device. The graphical illustration illustrates how a user is to properly focus the device (of the document for a stationary camera) for the camera with the device in the optimal orientation.

In an embodiment, at 351, the optimal image reorientation manager superimposes the graphical illustration as a rectangle in the optimal orientation on the display.

In an embodiment of 351 and at 352, the optimal image reorientation manager presents the graphical illustration as the rectangle appears in the current orientation and moves as a video illustration to the optimal orientation.

At 360, the optimal image reorientation manager activates the camera for capturing an optimal document image from a particular frame when the particular frame is substantially centered within the graphical illustration with the device (of the document with a stationary camera) in the optimal orientation.

According to an embodiment, at 361, the optimal image reorientation manager automatically activates the camera as soon as the particular frame is substantially centered within the graphical illustration for capturing the optimal document image.

In the embodiments of 360 and 361, substantially centered means within a predefined threshold or tolerance of being an actual or a true center.

Figure 4:
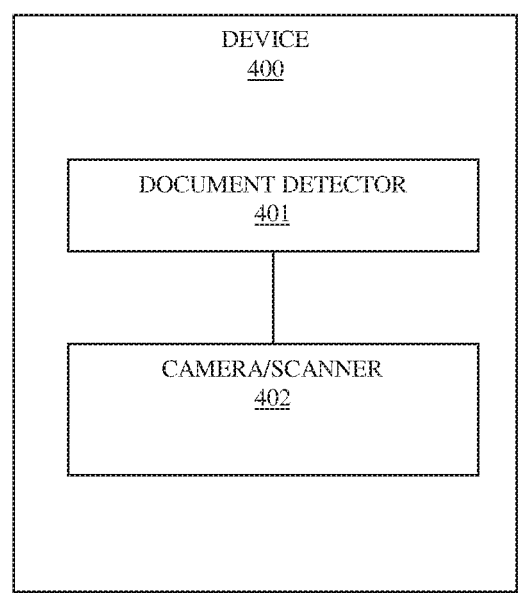
FIG. 4 is a diagram of device that performs automatic document reorientation processing, according to an example embodiment.

FIG. 4 is a diagram of device 400 that performs automatic document reorientation processing, according to an example embodiment. The components of the device 401 are programmed and reside within memory and/or a non-transitory computer-readable medium and execute on one or more processors of the device 401. The device 401 has access and can communicate over one or more networks; and the networks can be wired, wireless, or a combination of wired and wireless.

In an embodiment, the device 400 performs the processing, inter alia, of the FIGS. 1-3.

In an embodiment, the device 400 is the mobile device 120. In an embodiment, the mobile device 120 is one of: a phone, a tablet computer, a laptop computer, a wearable processing device, and a device that is part of the IoTs.

In an embodiment, the device 400 is the SST 110. In an embodiment, the SST 110 is one of: a POS terminal operated by a clerk, an ATM, and a kiosk.

In an embodiment, the device 400 is a standalone scanner/printer.

In an embodiment, the device 400 is a desktop computer.

The device 400 includes a document detector 401 and a camera/scanner 402.

The document detector 401 is operable to: 1) execute on one or more hardware processors of the device 400; 2) determine an optimal orientation for the device 400 or the document for capturing an optimal image of the document, (iii) interactively guide a user to orient the device 400 or the document in the optimal orientation, and (iv) activate the camera/scanner 402 to capture the optimal image when the device 400 or document is oriented in the optimal orientation and a particular fame is substantially centered and focused by the camera/scanner 402.

In an embodiment, the document detector 401 is the document detector 111.

In an embodiment, the document detector 401 is the document detector 121.

In an embodiment, the document detector 401 is the reorientation manager of the FIG. 2.

In an embodiment, the document detector 401 is the optimal image reorientation manager of the FIG. 3.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   capturing, by a device, document images for a document;
   identifying four edges for the document from the document images;
   obtaining a camera preview image when a camera of the device is in a camera preview mode;
   resolving an optimal orientation of the device for capturing an optimal image of the document based on the four edges and the camera preview image; and
   activating the device to capture the optimal image for the document in the optimal orientation, including displaying on a display of the device an indication of the optimal orientation of the device;
   wherein displaying includes presenting a guiding rectangle corresponding to the optimal orientation of the device in a screen on the display of the device and superimposed over the document images appearing in the display;
   wherein presenting further includes presenting a graphical illustration within the screen that illustrates moving the device from a current orientation to the optimal orientation and identifying when particular edges of a particular document image instance are aligned with a top-leftmost corner of the guiding rectangle and when a center of the particular document image instance corresponds to a calculated center for the four edges.

2. The method of claim 1, wherein identifying further includes activating the device for automatically recording the particular document image instance as the optimal image.

3. The method of claim 1, wherein identifying further includes presenting a button on the display that when activated captures the particular document image instance as the optimal image.

4. The method of claim 1 further comprising automatically sending the optimal image to an external document service that is remote and external to the device over a network for image processing on the optimal image.

5. A method, comprising:
   capturing, by a device, document images for a document;
   identifying four edges for the document from the document images, including calculating a first width-to-height ratio for the four edges of the document;
   obtaining a camera preview image when a camera of the device is in a camera preview mode, including calculating a second width-to-height ratio for the camera preview image;
   resolving an optimal orientation for capturing an optimal image of the document based on the four edges and the camera preview image, including comparing the second width-to-height ratio to a predefined value and comparing the second width-to-height ratio against the first width-to-height ratio for resolving the optimal orientation; and
   activating the device to capture the optimal image for the document in the optimal orientation.

6. A method, comprising:
   capturing, by a device, document images for a document;
   identifying four edges for the document from the document images including calculating a first width-to-height ratio for the four edges of the document;

obtaining a camera preview image when a camera of the device is in a camera preview mode including calculating a second width-to-height ratio for the camera preview image;

resolving an optimal orientation of the device for capturing an optimal image of the document based on the four edges and the camera preview image including comparing the second width-to-height ratio to a predefined value and comparing the second width-to-height ratio against the first width-to-height ratio; and activating the device to capture the optimal image for the document in the optimal orientation, including displaying on a display of the device an indication of the optimal orientation of the device.

* * * * *